US009460342B1

(12) United States Patent
Freund et al.

(10) Patent No.: US 9,460,342 B1
(45) Date of Patent: Oct. 4, 2016

(54) DETERMINING BODY MEASUREMENTS

(71) Applicant: Google Inc., Mountain View, CA (US)

(72) Inventors: Martin Brandt Freund, Mountain View, CA (US); Yuanying Xie, Mountain View, CA (US)

(73) Assignee: Google Inc., Mountain View, CA (US)

( * ) Notice: Subject to any disclaimer, the term of this patent is extended or adjusted under 35 U.S.C. 154(b) by 379 days.

(21) Appl. No.: 13/959,594

(22) Filed: Aug. 5, 2013

(51) Int. Cl.
*G06K 9/00* (2006.01)

(52) U.S. Cl.
CPC .................. *G06K 9/00369* (2013.01)

(58) Field of Classification Search
None
See application file for complete search history.

(56) References Cited

U.S. PATENT DOCUMENTS

| | | | | |
|---|---|---|---|---|
| 8,655,053 B1* | 2/2014 | Hansen | .............. | G06Q 30/0241 382/154 |
| 8,908,928 B1* | 12/2014 | Hansen | .............. | G06K 9/00362 382/111 |
| 2010/0030578 A1* | 2/2010 | Siddique | .......... | G06Q 10/03637 705/3 |
| 2010/0111370 A1 | 5/2010 | Black et al. | | |
| 2011/0246329 A1* | 10/2011 | Geisner | ................... | G06F 3/017 705/27.1 |
| 2011/0295693 A1* | 12/2011 | Clavin | ............... | G06Q 30/0269 705/14.66 |
| 2012/0086783 A1 | 4/2012 | Sareen | | |
| 2012/0299912 A1* | 11/2012 | Kapur | ..................... | G06F 3/017 345/419 |
| 2013/0108121 A1 | 5/2013 | De Jong | | |
| 2013/0151382 A1 | 6/2013 | Fuller | | |
| 2013/0179288 A1* | 7/2013 | Moses | .................... | G06Q 10/00 705/26.1 |
| 2013/0215116 A1* | 8/2013 | Siddique | ............ | G06Q 30/0643 345/420 |
| 2015/0302505 A1* | 10/2015 | Di | ...................... | G06K 9/00362 705/26.7 |

FOREIGN PATENT DOCUMENTS

WO     0153910     7/2001

\* cited by examiner

*Primary Examiner* — Nancy Bitar

(57) ABSTRACT

Implementations generally relate to determining body measurements. In some implementations, a method includes receiving a plurality of images associated with a subject user. The method also includes generating a 3-dimensional composition of the subject user based on the images. The method also includes determining one or more initial body measurements based the 3-dimensional composition and one or more known reference dimensions. The method also includes modifying the one or more initial body measurements based on one or more modifying criteria.

18 Claims, 5 Drawing Sheets

DETERMINING BODY MEASUREMENTS

BACKGROUND

Clothing retailers commonly enable customers to purchase clothing merchandise online. Some clothing retailers enable customers to provide or determine clothing sizes remotely in a variety of ways. For example, a customer may enter body measures online. A customer may submit photos online. Such measurements and/or photos may be used by the retailer to determine clothing sizes for the customer.

SUMMARY

Implementations generally relate to determining body measurements. In some implementations, a method includes receiving a plurality of images associated with a subject user. The method also includes generating a 3-dimensional composition of the subject user based on the images. The method also includes determining one or more initial body measurements based the 3-dimensional composition and one or more known reference dimensions. The method also includes modifying the one or more initial body measurements based on one or more modifying criteria.

With further regard to the method, in some implementations, the one or more known reference dimensions are based on one or more objects in the images. In some implementations, the one or more modifying criteria include historical body measurement criteria. In some implementations, the one or more modifying criteria include age criteria. In some implementations, the one or more modifying criteria include geographic location criteria. In some implementations, the method includes providing a recommendation for an article of clothing based on the one or more body measurements. In some implementations, the method includes providing a recommendation for an article of clothing based on the one or more body measurements and clothing preferences of the subject user.

In some implementations, a method includes receiving a plurality of images associated with a subject user. The method also includes generating a 3-dimensional composition of the subject user based on the images. The method also includes determining one or more initial body measurements based the 3-dimensional composition and one or more known reference dimensions, where the one or more known reference dimensions are based on one or more objects in the images. The method also includes modifying the one or more initial body measurements based on one or more modifying criteria.

With further regard to the method, in some implementations, the one or more modifying criteria include historical body measurement criteria. In some implementations, the one or more modifying criteria include age criteria. In some implementations, the one or more modifying criteria include geographic location criteria. In some implementations, the method also includes providing a recommendation for an article of clothing based on the one or more body measurements. In some implementations, the method also includes providing a recommendation for an article of clothing based on the one or more body measurements and clothing preferences of the subject user.

In some implementations, a system includes one or more processors, and logic encoded in one or more tangible media for execution by the one or more processors. When executed, the logic is operable to perform operations including: receiving a plurality of images associated with a subject user; generating a 3-dimensional composition of the subject user based on the images; determining one or more initial body measurements based the 3-dimensional composition and one or more known reference dimensions; and modifying the one or more initial body measurements based on one or more modifying criteria.

With further regard to the system, in some implementations, the one or more known reference dimensions are based on one or more objects in the images. In some implementations, the one or more modifying criteria include historical body measurement criteria. In some implementations, the one or more modifying criteria include age criteria. In some implementations, the one or more modifying criteria include geographic location criteria. In some implementations, the logic when executed is further operable to perform operations including providing a recommendation for an article of clothing based on the one or more body measurements. In some implementations, the logic when executed is further operable to perform operations including providing a recommendation for an article of clothing based on the one or more body measurements and clothing preferences of the subject user.

DETAILED DESCRIPTION

Implementations for determining body measurements are described. In various implementations, a system receives images associated with a subject user. The system then generates a 3-dimensional composition of the subject user based on the images. The system then determines one or more body measurements associated with the subject user based on the 3-dimensional composition.

In some implementations, to determine the one or more body measurements, the system determines one or more initial body measurements based on one or more known reference dimensions, and then modifies the initial body measurements based on one or more modifying criteria. The modifying criteria may include, for example, historical body measurement criteria, age criteria, geographic location criteria, etc.

In some implementations, the system may provide a recommendation for an article of clothing based on the one or more body measurements, and based on clothing preferences of the subject user. In some implementations, the subject user may provide the clothing preferences to the system. In some implementations, the clothing preferences may be based on historical data associated with the subject user input of clothing preferences.

Figure 1:
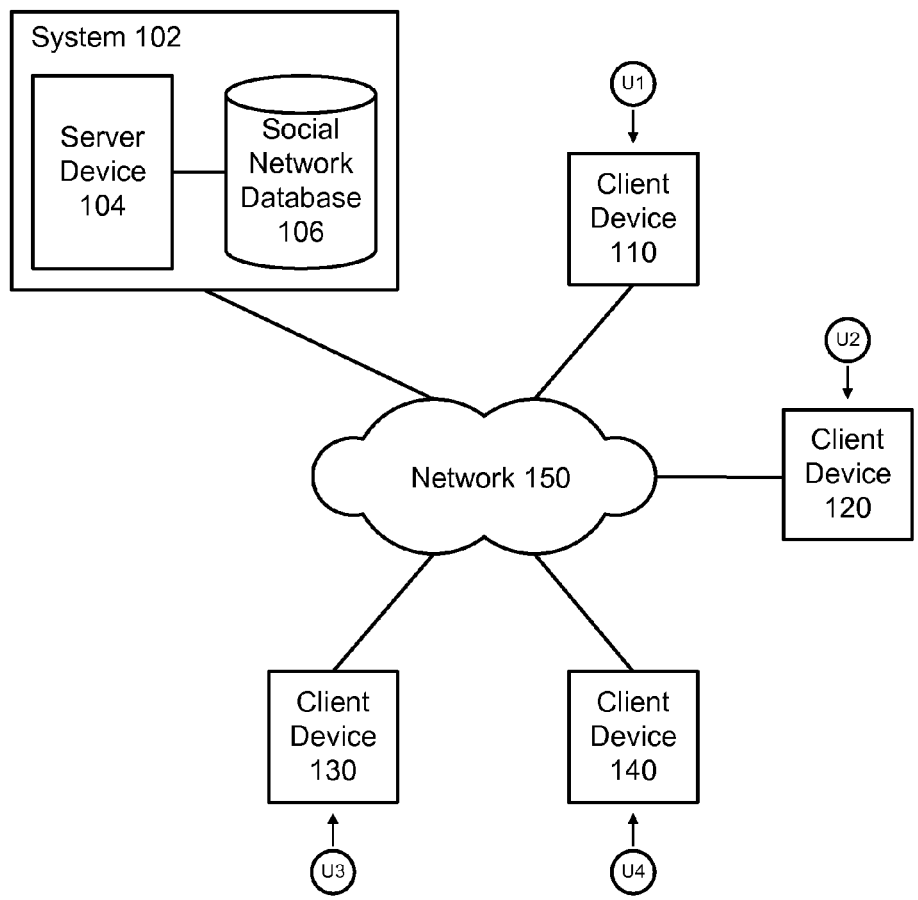
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. Users U1, U2, U3, and U4 may also interact with system 102 using respective client devices 110, 120, 130, and 140.

In the various implementations described herein, processor (not shown) of system 102 causes various elements described herein (e.g., measurement summaries, clothing recommendations, etc.) to be displayed to a given user in a user interface on a display screen.

In various implementations, system 102 may utilize a recognition algorithm to facilitate in determining body measurements. Example implementations of recognition algorithms are described in more detail below.

Figure 2:
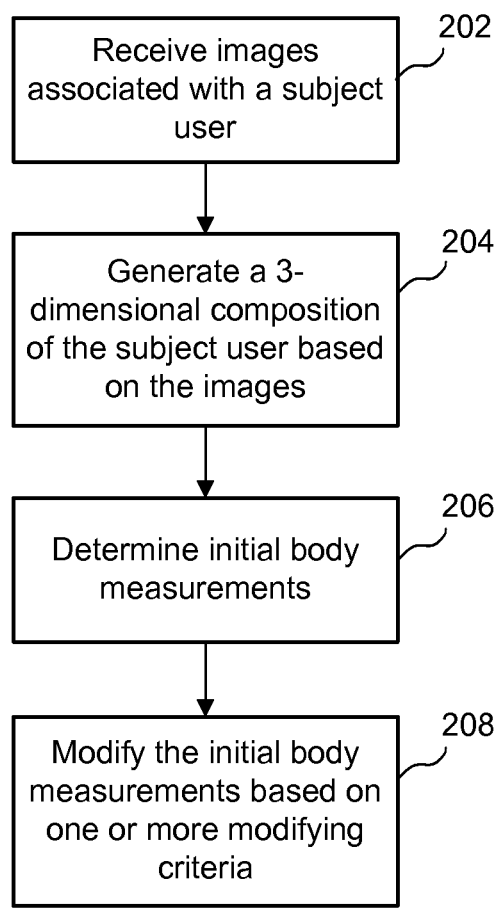
FIG. 2 illustrates an example simplified flow diagram for determining body measurements, according to some implementations.

FIG. 2 illustrates an example simplified flow diagram for determining body measurements, according to some implementations. Referring to both FIGS. 1 and 2, a method is initiated in block 202, where system 102 receives a plurality of images associated with a subject user. In various implementations, the images may be received when the subject user uploads the images to system 102. In some implementations, system 102 may enable a camera device (e.g., smart phone, etc.) of the subject user to automatically upload images to system 102 as the camera device captures photos.

In block 204, system 102 generates a 3-dimensional composition of the subject user based on the images. System 102 may then use all of the images in which the subject user is tagged and/or recognized, for instance by a facial recognition algorithm, (which could include hundreds of images) to build or stitch a 3-dimensional composite of the subject user using the amalgamated set of images. Such images may include full shots of the subject user, partial shots from waist and above, head shots (e.g., neck and above), peripheral shots (e.g., back and/or side), etc.

In some implementations, system 102 may combine or stitch together matching points in the images in order to create a 3d object of the subject user. In some implementations, system 102 may extract information such as metadata from tags in the images.

In some implementations, system 102 may select which images to use for the 3-dimensional composition based on timestamps associated with each image. For example, system 102 may select the most recent images in order to generate one 3-dimensional composition that more closely matches the subject user's current size and shape.

In block 206, system 102 determines one or more initial body measurements based on the 3-dimensional composition and based on one or more known reference dimensions. In various implementations, the one or more known reference dimensions are based on one or more objects in the images.

Figure 3:
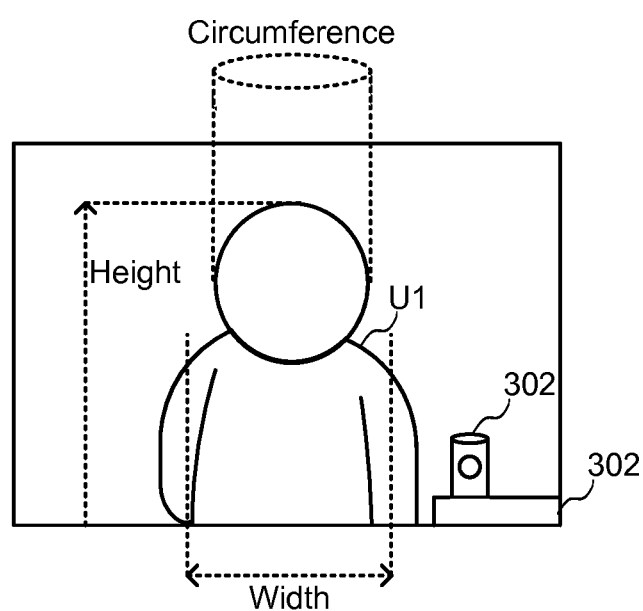
FIG. 3 illustrates an example image of a subject user and associated measurements, which may be used to implement the implementations described herein.

FIG. 3 illustrates an example image 300 of a subject user and associated measurements, which may be used to implement the implementations described herein. FIG. 3 shows a subject user U1 standing next to a soda can 302, which is sitting on top of a table 302.

In various scenarios, one or more objects in a given image may have known dimensions. Such objects may include any variety of objects such as soda cans, wine bottles, cars, etc., even another person with associated known dimensions or measurements, where system 102 may determine the dimensions of each object. For example, soda can 302 of FIG. 3 may be identifiable with a logo. System 102 may determine the height and diameter of soda can 302, or any other objects in a given image (e.g., via product specifications or other product information available in a database or via any suitable search, etc.). System 102 may then use one or more objects having know reference dimensions as frames of reference to ascertain one or more body measurements of the subject user. For example, system 102 may determine the height of the subject user, head circumference, shoulder width, etc. For ease of illustration, FIG. 3 shows a single-view point (front side) of subject user U1, and shows a several measurements. As indicated herein, in various implementations, system 102 determines body dimensions using a 3-dimensional composition, which may include numerous viewpoints, angles, distances, objects, etc. System 102 may also determine numerous other body dimensions, such as chest size, waist size, pant length, etc.

System 102 may already have current body measurements of another person standing next to the subject user. Because many images of people in social networks have multiple people tagged in groups, system 102 may use various people as frames of reference for height and depth perception.

Such dimensions may be stored in any suitable database accessible by system 102, and system 102 may utilize such dimensions as points of reference to determine the body measurements of the subject user. In various implementations, system 102 may determine relative distances between the subject user and particular objects in order to adjust relative sizing.

In block 208, system 102 modifies the one or more initial body measurements based on one or more modifying criteria. In some scenarios, system 102 may not have any or enough current photos to accurately determine the subject user's current body measurements. Also, even current images may not precisely indicate the subject user's actual body measurements due to various image qualities, distortions, etc. As described in more detail below, system 102 may modify one or more body measurements of the subject user based on various factors such as age, geographic location, time of year.

In various implementations, the one or more modifying criteria includes historical body measurement criteria. For example, system 102 may determine from collected images that the subject user tends to fluctuate in size over the year and such fluctuations may follow seasonal cycles. For example, the subject user may be bigger in the winter and thinner in the summer (e.g., from more physical activity, etc.). In another example, system 102 may determine that the subject user has been getting thinner or getting bigger over time based on images of the subject user.

As such, in some implementations, if the 3-dimensional composition indicates one or more body measurements that do not match or that deviate by a predetermined amount from the historical pattern (e.g., cycle, trend, etc.), system 102 may adjust one or more initial body measurements toward the historical pattern.

In some implementations, system 102 may predict one or more body measurements into the future based on historical patterns. In an example scenario, the subject user may shop for summer clothing during the winter season (to get sale prices). System 102 may predict body measurements several months into the future or follow historical cycles and/or trends for the subject user and make recommendations accordingly.

In various implementations, the one or more modifying criteria includes age criteria. System 102 may determine overall trends in body measurements based on age. For example, men and women may tend to gain weight and get bigger as they get older, and the particular age that one's body measurements change will depend on the particular individual.

System 102 may determine age information associated with the subject user from a social network system. For example, the subject user may have stored his or her birthday in the social network. Based on the time stamp of each image, system 102 may determine the age of the subject user.

In some implementations, system 102 may determine if and when a new trend in body measurements occurs with the subject user based on collected images of the subject user. System 102 may also correlate the pattern change with the age of the subject user. For example, system 102 may determine that a particular male subject user has gotten bigger around the waist over a several-year period, and that the subject user is 40. The correlation of the age with the historical pattern may trigger system 102 to adjust one or more initial body measurements toward the historical pattern.

As indicated above, in some implementations, system 102 may predict one or more body measurements into the future based on historical patterns. As such, system 102 may predict body measurements several months into the future or follow historical cycles and/or trends for the subject user, and may make recommendations accordingly.

In various implementations, the one or more modifying criteria includes geographic location criteria. System 102 may determine overall trends in body measurements based on geographic data. For example, body measurements of people certain countries and/or climates may tend to follow a general pattern. System 102 may determine geographic information associated with the subject user from a social network system. For example, the subject user may have stored the geographic location where he or she resides in the social network. Based on the geographic location information, system 102 may determine the country, climate, etc.

In some implementations, system 102 may determine if and when a new trend in body measurements occurs with the subject user based on collected images of the subject user. System 102 may also correlate the pattern change with the geographic location of the subject user. The correlation of the age with the geographic location may trigger system 102 to adjust one or more initial body measurements toward the historical pattern.

As indicated above, in some implementations, system 102 may predict one or more body measurements into the future based on historical patterns. As such, system 102 may predict body measurements several months into the future or follow historical cycles and/or trends for the subject user and make recommendations accordingly. Also, geographic data and time of year may be considered together to yield appropriate seasonal attire, especially when combined with the age and gender of the subject user.

While implementations have been described in the context of history, age, geographic location, other contexts and criteria are possible, depending on the particular implementation. For example, other factors may include ethnicity, lifestyle, life events (e.g., having children), etc.

In some implementations, system 102 may be used as an application programming interface (API). For example, the subject user may be browsing through sweaters on a particular online clothing retailer and may use a widget to log in to their social network account associated with system 102. In some implementations, this may initiate an application associated with a social network to determine the body measurements, thereby enabling the subject user to automatically get sized for clothing.

In various implementations, the resulting body measurements may used to provide tailored sizing information (e.g., clothing shape and sizes) for users and e-commerce retailers such as clothing and apparel retailers. For example, in some implementations, system 102 provides one or more recommendations for articles of clothing based on the one or more body measurements.

Figure 4:
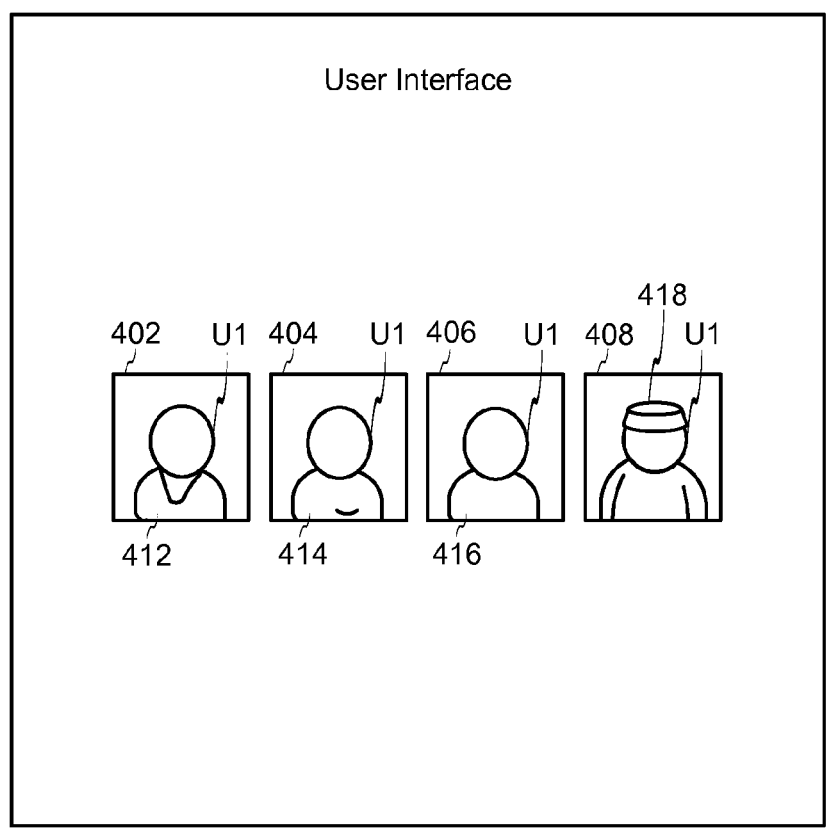
FIG. 4 illustrates an example user interface displaying images of a subject user and associated clothing recommendations, which may be used to implement the implementations described herein.

FIG. 4 illustrates an example user interface 400 displaying images of a subject user and associated clothing recommendations, which may be used to implement the implementations described herein. As shown, subject user U1 appears is images 402, 404, 406, and 408. In this specific example, system 102 causes user interface 400 to show subject user U1 in various recommended articles of clothing. For example, images 402, 404, 406, and 408 show subject user U1 in respective shirts 412, 414, and 416, and a hat 418. In various implementations, system 102 may also provide one or more recommendations for articles of clothing based on the one or more body measurements and clothing preferences of the subject user.

In various implementations, system 102 enables the subject user to provide clothing preferences to system 102. Clothing preferences may include color, style, liked brands, etc. Clothing preferences may also include fit. For example, some people may prefer looser fitting clothes. Some people may prefer tighter fitting closes. System 102 may by default recommend a particular size for the subject user, yet determine that the subject user prefers a particular fit (e.g., looser, tighter, etc.). As such, system 102 may recommend a particular clothing item and multiple sizes (e.g., a well fit size, and a loose/tight size depending on the preference).

While some implementations are described in the context of clothing, these same implementations may also apply to any apparel including jewelry, accessories, etc.

System 102 may enable and/or prompt the subject user to manually input his or her clothing preferences. System 102 may provide a series of prompts and/or entry fields to guide the subject user in providing his or her clothing preferences. For example, system 102 may show the subject user a particular article of clothing and ask the subject user if he or she likes or dislikes the clothing item. In some implementations, system may provide scale rating selection (e.g., 1-5 stars) for each clothing item. System may then ascertain preferences from the collected data.

In various implementations, the clothing preferences may be based on historical data associated subject user input of clothing preferences. For example, the subject user's preferences (e.g., taste) may change over time or may be seasonal. As such, system 102 may continually adjust the clothing preferences over time. Implementations eliminate or minimize sizing issues by dynamically and intelligently determining the subject users body measurements.

In some implementations, system 102 may determine clothing preferences and sizes based on past purchase and/or returns. For example, system 102 may store and analyze information associated with what the subject user has bought or returned in terms of styles and sizes. If the subject user exchanged a clothing item, system 102 may determine the new size, whether it went up or down, etc.

In some implementations, system 102 may store style and size information based on brand. For example, some brands may favor particular colors, color combinations, cuts, etc. Some brands may run large, some small, etc. System 102 may recommend clothing items accordingly, based on brand styles and sizing.

In some implementations, system 102 may utilize the one or more body measurements for proactive advertising. For example, system 102 may display or recommend particular clothing items from particular retailers and/or brands in a portion of a social network page. Such advertising may advertise clothes with no need for the subject user to visit a particular retailer or brand website.

In various implementations, system 102 may provide advertising to users using similar principles described herein in association with recommendations. For example, system 102 may provide advertising based on body measurements that have been modified based on historical body measurement criteria, age criteria, geographic location criteria, etc.

In some implementations, system 102 may show clothes on a graphic depiction of the subject user, where the clothes selected for advertising may be based on what the subject user has viewed and/or purchased in the past. The clothes may also be clothes that the subject user has never seen, but that are similar in style to clothes that the subject user has viewed and/or purchased in the past. The selection of clothes advertised may be based on the preferences determined for the subject user as described herein. In some implementations, system 102 may show clothes on a model who looks like or has similar features to the subject user. Such images may make it easier for the subject user to visualize himself or herself wearing such clothes.

Although some implementations have been described in the context of online shopping, these implementations may also apply to other contexts, for example. Implementations may apply to video games, where system 102 generates a 3-dimensional composition based on images, modifies images based on modifying criteria described herein. System 102 may then recommend and/or enable the subject user to select clothing and other apparel for video game avatars. Implementations my also apply to a portion of a subject user's body. For example, a head shot of the subject user may be useful for showing the subject user depicted in glasses, hats, or other head gear.

With respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Implementations described herein provide various benefits. For example, implementations eliminate or minimize sizing issues, and enables users to purchase clothing without needing to try on the clothes on before buying. Implementations greatly simplify clothes sizing.

Figure 5:
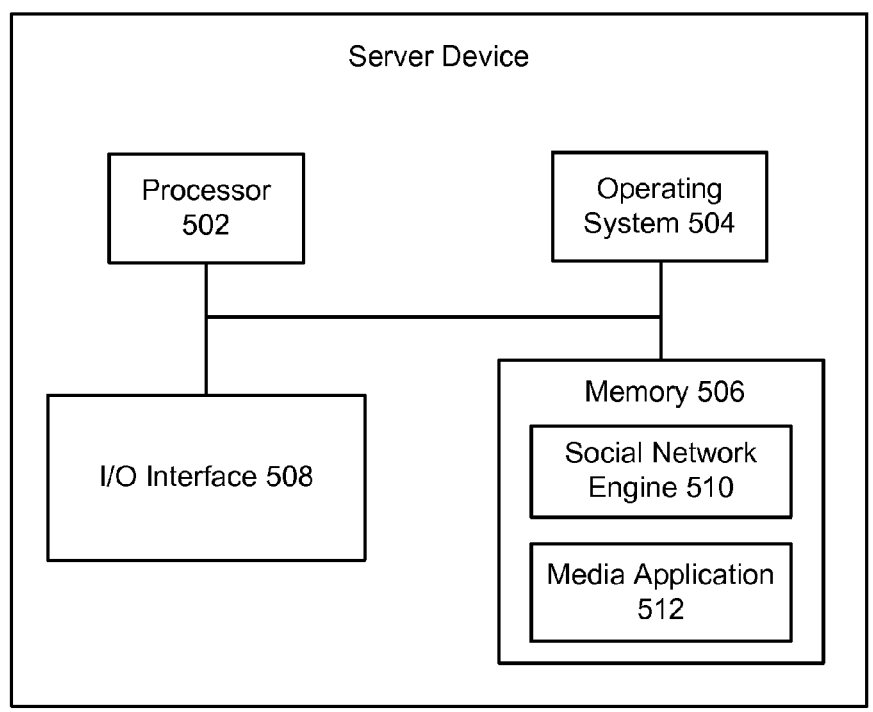
FIG. 5 illustrates a block diagram of an example server device, which may be used to implement the implementations described herein.

FIG. 5 illustrates a block diagram of an example server device 500, which may be used to implement the implementations described herein. For example, server device 500 may be used to implement server device 104 of FIG. 1, as well as to perform the method implementations described herein. In some implementations, server device 500 includes a processor 502, an operating system 504, a memory 506, and an input/output (I/O) interface 508. Server device 500 also includes a social network engine 510 and a media application 512, which may be stored in memory 506 or on any other suitable storage location or computer-readable medium. Media application 512 provides instructions that enable processor 502 to perform the functions described herein and other functions.

For ease of illustration, FIG. 5 shows one block for each of processor 502, operating system 504, memory 506, I/O interface 508, social network engine 510, and media application 512. These blocks 502, 504, 506, 508, 510, and 512 may represent multiple processors, operating systems, memories, I/O interfaces, social network engines, and media applications. In other implementations, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
   receiving a plurality of images associated with a subject user;
   generating a 3-dimensional composition of the subject user based on the plurality of images, wherein generating the 3-dimensional composition comprises stitching together matching points in the plurality of images;
   determining one or more initial body measurements of the subject user based on the 3-dimensional composition and one or more known reference dimensions, wherein the one or more known reference dimensions are based on one or more objects in at least one of the plurality of images;
   modifying the one or more initial body measurements of the subject user to generate one or more modified body measurements based on one or more modifying criteria, wherein the one or more modifying criteria includes one or more stored historical patterns of body measurements;
   determining historical preferences data associated with at least one of clothing preferences and fashion accessories preferences of the subject user, based, at least in part, on at least one of: past purchases and returns; and
   providing a recommendation for an article of clothing or fashion accessory, wherein the recommendation is based, at least in part, on the one or more modified body measurements and on the historical preferences data.

2. The method of claim 1, further comprising: determining an age of the subject user, wherein the one or more modifying criteria further includes whether the determined age of the subject user meets an age criteria.

3. The method of claim 1, wherein the one or more modifying criteria includes geographic location criteria and a current time of year.

4. A method comprising:
   receiving a plurality of images associated with a subject user;
   generating a 3-dimensional composition of the subject user based on the plurality of images;
   determining one or more initial body measurements of the subject user based the 3-dimensional composition and one or more known reference dimensions;
   modifying at least one of the one or more initial body measurements of the subject user to generate one or more modified body measurements based on one or more modifying criteria, wherein the one or more modifying criteria includes one or more stored historical patterns of body measurements;
   determining historical preferences data associated with at least one of clothing preferences and fashion accessories preferences of the subject user, based, at least in part, on at least one of: past purchases and returns; and
   providing a recommendation for an article of clothing or fashion accessory, wherein the recommendation is based, at least in part, on the one or more modified body measurements and on the historical preferences data.

5. The method of claim 4, wherein the one or more known reference dimensions are based on one or more objects in at least one image of the plurality of images and a determined distance between the subject user and the one or more objects in the respective at least one image of the plurality of images.

6. The method of claim 4, further comprising: determining an age of the subject user, wherein the one or more modifying criteria further includes whether the determined age of the subject user meets an age criteria.

7. The method of claim 4, wherein the one or more modifying criteria includes geographic location criteria and a current time of year.

8. The method of claim 4, further comprising providing a recommendation for an article of clothing based on the one or more body measurements.

9. A system comprising:
   one or more processors; and
   logic encoded in one or more tangible media for execution by the one or more processors and when executed operable to perform operations comprising:
   receiving a plurality of images associated with a subject user;
   generating a 3-dimensional composition of the subject user based on the plurality of images;
   determining one or more initial body measurements based the 3-dimensional composition and one or more known reference dimensions;
   modifying the one or more initial body measurements of the subject user to generate one or more modified body measurements based on one or more modifying criteria, wherein the one or more modifying criteria includes a deviation from predetermined body measurements based on one or more stored historical patterns of body measurements;
   determining historical preferences data associated with at least one of clothing preferences and fashion accessories preferences of the subject user, based, at least in part, on at least one of: past purchases and returns; and
   providing a recommendation for an article of clothing or fashion accessory, wherein the recommendation is based, at least in part, on the one or more modified body measurements and on the historical preferences data.

10. The system of claim 9, wherein the one or more known reference dimensions are based on one or more objects in at least one image of the plurality of images and a determined distance between the subject user and the one or more objects in the respective at least one image of the plurality of images.

11. The system of claim 9, further comprising: determining an age of the subject user, wherein the one or more modifying criteria further includes whether the determined age of the subject user meets an age criteria.

12. The system of claim 9, wherein the one or more modifying criteria includes geographic location criteria and a current time of year.

13. The method of claim 1, wherein the modified body measurement is a predicted future body measurement.

14. The method of claim 4, wherein the modified body measurement is a predicted future body measurement.

15. The system of claim 9, wherein the modified body measurement is a predicted future body measurement.

16. The method of claim 1, wherein the one or more objects includes a person in the image other than the subject user.

17. The method of claim 5, wherein the one or more objects includes a person in the image other than the subject user.

18. The system of claim 10, wherein the one or more objects includes a person in the image other than the subject user.

* * * * *